(12) United States Patent
Liu

(10) Patent No.: US 12,420,461 B2
(45) Date of Patent: Sep. 23, 2025

(54) METHOD OF MANUFACTURING A CUSTOMIZED MATTRESS

(71) Applicant: Shenghao Liu, Houston, TX (US)

(72) Inventor: Shenghao Liu, Houston, TX (US)

(*) Notice: Subject to any disclaimer, the term of this patent is extended or adjusted under 35 U.S.C. 154(b) by 206 days.

(21) Appl. No.: 18/211,418

(22) Filed: Jun. 19, 2023

(65) Prior Publication Data

US 2024/0416562 A1    Dec. 19, 2024

(51) Int. Cl.
| | |
|---|---|
| B29C 44/12 | (2006.01) |
| A47C 27/05 | (2006.01) |
| B29K 75/00 | (2006.01) |
| B29K 105/04 | (2006.01) |
| B29K 705/00 | (2006.01) |
| B29L 31/00 | (2006.01) |

(52) U.S. Cl.
CPC .......... *B29C 44/1266* (2013.01); *A47C 27/05* (2013.01); *B29K 2075/00* (2013.01); *B29K 2105/04* (2013.01); *B29K 2705/00* (2013.01); *B29L 2031/751* (2013.01)

(58) Field of Classification Search
CPC A47C 27/05; B29C 44/1266; B29L 2031/751
See application file for complete search history.

(56) References Cited

U.S. PATENT DOCUMENTS

| | | | |
|---|---|---|---|
| 3,099,844 A * | 8/1963 | Bolesky | A47C 7/34 297/452.5 |
| 7,386,903 B2 | 6/2008 | Hochschild | |
| 7,496,981 B2 | 3/2009 | Cucurull | |
| 9,332,857 B2 | 5/2016 | Alzoubi et al. | |
| 9,504,333 B2 | 11/2016 | Rawls-Meehan et al. | |
| 11,019,936 B2 | 6/2021 | Fisher | |
| 2004/0025258 A1 | 2/2004 | Van Der Wurf et al. | |
| 2004/0237204 A1 | 12/2004 | Antinori | |
| 2005/0108827 A1 | 5/2005 | Cervera | |
| 2011/0197367 A1 | 8/2011 | Mossbeck | |
| 2012/0186027 A1 | 7/2012 | Gladney et al. | |
| 2014/0325764 A1 | 11/2014 | Khambete et al. | |

(Continued)

FOREIGN PATENT DOCUMENTS

| | | |
|---|---|---|
| JP | 2019162205 | 9/2021 |
| KR | 200417963 | 6/2006 |

(Continued)

*Primary Examiner* — James Sanders
(74) *Attorney, Agent, or Firm* — Nicholas E. Najera

(57) ABSTRACT

The method of manufacturing a hybrid mattress discloses a novel molding process to embed springs into foam, comprising the following steps: (1) creating a mold board with a number of pegs positioned in a specific configuration; (2) placing springs around the pegs positioned on the mold board; (3) placing the mold board on a pouring table with the pegs and springs facing upward; (4) pouring liquid foam around the pegs onto the mold board; (5) waiting for the liquid foam to mature; and (6) removing the mold from the mature foam with now embedded springs. The result is a mattress with dual support provided from the springs and foam. Embedding the springs into foam enhances the elasticity and durability of the spring itself, thereby extending the useful life of the mattress. Embedding the springs into the foam reduces the common coiling noises that are very common in the prior art.

13 Claims, 10 Drawing Sheets

(56) References Cited

U.S. PATENT DOCUMENTS

| | | |
|---|---|---|
| 2015/0335163 A1 | 11/2015 | Kilgore et al. |
| 2016/0220032 A1 | 8/2016 | Labanowicz |
| 2016/0270545 A1 | 9/2016 | Codos |
| 2017/0035213 A1 | 2/2017 | Limer |

FOREIGN PATENT DOCUMENTS

| | | |
|---|---|---|
| KR | 100938822 | 1/2010 |
| KR | 20090079642 | 1/2010 |
| KR | 20100008737 | 10/2011 |

* cited by examiner

METHOD OF MANUFACTURING A CUSTOMIZED MATTRESS

BACKGROUND OF THE INVENTION

Field of the Invention

The present invention relates generally to a method of manufacturing an improved hybrid mattress, and, more particularly, to a method of manufacturing a customizable hybrid mattress with enhanced support and an extended useful life.

Description of Related Art

According to a survey conducted by the National Sleep Foundation in 2011, the average American spends approximately 7.5 hours per night on their mattress. Assuming an average lifespan of 78 years, the average American would spend more than 23 years of their life on their mattress. In this regard, the type of mattress a person buys is an important decision affecting both comfort and health.

The modern mattress has evolved over centuries of human history. The earliest known mattresses were made of natural materials such as straw, leaves, and animal skins. These materials were stuffed into cloth bags and placed on the ground or raised platforms to sleep on. To a large extent the development of the mattress is closely linked with that of the bed. In many historic societies, the bed was considered the most important piece of furniture in the household; often, it provided a central gathering place for dining and relaxing as well as sleeping. Over the centuries, bed frames became more elaborate for those who could afford luxury; however, mattresses themselves remained unsophisticated—and uncomfortable. Until the twentieth century, they generally consisted of lumpy pads filled with horsehair, cotton, or rags. Poorer people relied on ticks—fabric sacks stuffed with straw, corn cobs, or other crop debris. In addition to offering an inconsistent texture, such primitive mattresses were difficult to clean—and they generally started out dirty, stuffed as they were with agricultural debris that often entered the pad or ticking with soil and insects. However, they offered one concrete advantage: made at home from cast-off farm goods, they were cheap. Even late in the nineteenth century when small local manufacturers began to produce mattresses commercially, the items remained inexpensive because early mattress makers continued to rely on extremely inexpensive stuffing (usually, unusable fabric remnants discarded by second-hand tailors).

Mattresses with stabilizing interior springs, probably the single most significant advance in mattress design, were first developed during the mid-1800s. By placing a set of uniform springs inside layers of upholstery, mattress manufacturers could imbue their product with a firm, resilient, and uniform texture. In the late 19th century, German inventor Heinrich Westphal patented the innerspring mattress (U.S. Pat. No. 428,701). This design included coiled springs that provided more support and comfort than previous designs. However, because so-called innerspring mattresses were expensive to manufacture, only luxury ships and hotels that could pass the cost along to their affluent patrons purchased them initially. It was not until after World War I that innerspring mattresses were mass-produced by Zalmon Simmons, Jr., the president of a company that had theretofore produced bedsteads. Despite the fact that Simmons asked 40 dollars—more than twice the cost of the finest horsehair mattress available at that time—for his innerspring mattress in 1926, his products proved so comfortable that millions of Americans purchased them.

To render potential customers more willing to spend what must have struck many as a small fortune on his innerspring mattress, Simmons promoted the advantages of a good night's sleep. The effectiveness of this marketing strategy has only increased over the years, as subsequent research has confirmed that abundant, high-quality sleep constitutes a fundamental component of good health.

To these ends, different manufacturers over the years have sought to improve the mattress. In the 1930s, Dunlopillo introduced the first latex foam mattress. Latex foam was more durable and provided better support than traditional materials such as cotton or wool. In the 1960s, NASA developed memory foam for use in aircraft seats. Memory foam is made from viscoelastic materials and conforms to the shape of the body, providing more customized support. In recent years, the hybrid mattress has become popular. These mattresses combine the support of innerspring coils with the comfort of memory foam or latex foam layers.

Today's sophisticated mattresses improve sleeping comfort in several ways. First, through a variety of enhanced innerspring designs, modern mattresses distribute the weight of the body over a broad area; this also helps to prevent differential wear on the mattress. In addition, mattresses offer surfaces of appropriate softness and flexibility to help keep the spine in its naturally curved position. However, contemporary mattress manufacturers carefully avoid excessively soft surfaces that would distort the position of the sleeper's spine, resulting in discomfort or even pain.

Today, most mattresses are manufactured according to standard sizes. This standardization was initiated by the industry to resolve any dimensional discrepancies that might occur between companies that manufacture beds and companies that make mattresses. The sizes include the twin bed, 39 inches wide and 74 inches long; the double bed, 54 inches wide and 74 inches long; the queen bed, 60 inches wide and 80 inches long; and the king bed, 78 inches wide and 80 inches long.

The "core" of a typical mattress is the innerspring unit, a series of wire coils that are attached to one another with additional wire. The upholstery layers are affixed to the innerspring: the first, called the insulator, is fitted directly onto the innerspring and prevents the next layer, the cushioning, from molding to the coils. While the insulator is fairly standard, the number of cushioning layers can vary widely in number, ranging from two to eight layers and from ¼ inch to 2 inches (0.63 to 5 centimeters) in thickness. Moving outward, the next component is the flanges, connecting panels that are attached to the mattress' quilted cover with large, round staples called hogs rings. The top, bottom, and side panels of the mattress are stitched together with border tape.

While a wide variety of springs are designed to accommodate special needs and situations, the four most commonly used coils are the Bonnell, the Offset, the Continuous, and the Pocket System. The Bonnell springs are hourglass-shaped and knotted at both ends. The Offset design is similarly hourglass-shaped, but its top and bottom are flattened to facilitate a hinging action between the coils. The Continuous innerspring consists of one extremely long strand of steel wire configured into S-shaped units. Finally, in the Pocket System, each coil is encased in a fabric casing that also connects it to neighboring coil-casing units.

A typical mattress contains between 250 and 1,000 coil springs, and mattresses that use fewer coils normally require a heavier gauge of wire. It is not uncommon for an innerspring unit to require as much as 2,000 linear feet (610 meters) of steel wire. The individual coils can be joined in several ways. One common method is to use helicals—corkscrew-shaped wires that run along the top and bottom of the springs, lacing the coils together. Rigid border wires are sometimes attached around the perimeters to stabilize the unit.

Most manufacturers also produce foundation mattresses or box springs that lie directly beneath the mattress, resting on the frame of the bed. One of the most common types of box spring foundations use a spiked coil configuration, in which the springs are narrow at the bottom but spiral to a wider diameter at the top. While a spring system provides the most common type of box spring support, torsion bars are also sometimes used. Other foundation mattresses contain no springs at all but consist of a built-up wooden frame.

Mattresses are presently made of many materials, both natural and synthetic. The innerspring, helical, and box spring components are made from wire; the box spring wire is usually of a heavier gauge than that used in the innerspring. The insulator consists of semi-rigid netting or wire mesh, and the cushioning layers can comprise a number of different materials including natural fiber, polyurethane foam, and polyester. The flanges are made of fabric, and the hogs rings of metal. The top, bottom, and side panels consist of a durable fabric cover quilted over a backing of foam or fiber, and the binding.

Once the completed innerspring unit is received, workers manually apply the insulator. Next, they apply the cushioning layers that will determine the feel and comfort of the final product. Meanwhile, the decorative cover that will serve as the exterior for the top, bottom, and sides is made on a giant quilting machine, which controls a multitude of needles that stitch the cover to a layer of backing material.

Once the completed innerspring unit is received, workers manually apply the insulator. Next, they apply the cushioning layers that will determine the feel and comfort of the final product. Meanwhile, the decorative cover that will serve as the exterior for the top, bottom, and sides is made on a giant quilting machine, which controls a multitude of needles that stitch the cover to a layer of backing material.

The underlying box spring may consist of either a wooden frame with slats or of metal coils similar to those used in the mattress itself. The box spring may be upholstered, but, even if it is not, it always receives a fabric covering.

Most mattress manufacturers subcontract the production of the innerspring unit to an outside firm that specializes in making springs. Once the completed spring unit is received and inspected, the workers manually apply the insulator. Next, they apply the cushioning layers that will determine the feel and comfort of the final product.

While the mattress is being "built up" in one part of the plant, the decorative cover that will serve as the exterior for the top, bottom and sides is being made in another part. Usually this cover is made on a giant quilting machine, which controls a multitude of needles that stitch the cover to a layer of backing material. The stitching chosen serves both useful and ornamental purposes, as it must prevent the mattress cover from slipping or creeping over the layers of cushioning in addition to creating a visually pleasing exterior.

Once the fabric is quilted, it is cut into panels that will fit the top and bottom of the mattress. The side panels are often cut from this same composite or made separately on a border machine. If side handles or vents are to be added, they are attached to the side panels before these are applied to the mattress.

Specially modified sewing machines are used to attach the flanges to the top and bottom panels, and the hogs rings are stapled to the flanges. Everything is now ready for the closing operation, during which the hogs rings will be secured to the innerspring unit.

The closing operation is one of the most highly skilled and critical procedures in the entire process. It is done with a movable sewing head that is mounted on a track. Tape edge operators manually feed the top, bottom, and side panels and a heavy duty binding tape into the sewing machine as it moves around the mattress. As this combination of materials is fed into the machine, the operators uses their skill to feed the proper amount of each material into the machine to produce a professionally tailored product.

Some of the highest quality mattresses may also feature a pillowtop, a panel filled with soft upholstery and attached to the top and bottom panels of the mattress for a more luxurious feel and appearance. Pre-quilted, the pillowtop is then taped to the mattress.

If the desired box spring has a spiked coil design, it is made by stapling the bottom of each coil to a flat wooden frame. A wire grid is then placed on top of the springs and, once aligned, manually locked to them. A thin layer of upholstery is applied to the top. Once the cover is quilted, it is cut into top, bottom, and side panels. Next, flanges are added, and hogs rings are stapled to them. Finally, in the closing operation, workers use a movable sewing head mounted on a track to feed the top, bottom, and side panels and a heavy duty binding tape into the sewing machine as it moves around the mattress. The mattress is then ready for packaging.

Despite improvements made over decades, current innerspring mattresses suffer from many shortcomings. For example, the springs tend to be noisy, causing distractions and disturbances while the mattresses are in use. The springs also have a tendency to fail, causing discomfort to the user. Furthermore, current manufacturing processes require placement of the springs such that there are gaps between the springs where the mattress lacks any support for the user.

Even with the constant evolution of the mattress, there remains a present need for a method of manufacturing a customizable mattress depending on the specific needs of the customer. The mattress that is best for an individual depends on their personal preferences, sleep position, and any specific needs they may have, such as back pain or pressure relief. The disclosed method herein permits the customer to fully tailor their mattress to their needs.

BRIEF SUMMARY OF THE INVENTION

The method of manufacturing a hybrid mattress embodying the principles of the disclosed invention results in an improved hybrid mattress characterized by enhanced support and an extended useful life. The method utilizes a novel molding process to embed springs into foam. The result is a mattress with dual support provided from the springs and foam. Embedding the springs into foam enhances the elasticity and durability of the spring itself, thereby extending the useful life of the mattress up to fifteen years. Moreover, embedding the springs into the foam reduces the common coiling noises that are very common in the prior art. The method further allows the customer to fully customize the resulting mattress based on her needs.

The method of manufacturing an improved hybrid mattress comprises at least the following basic steps: (1) creating the mold board with a number of pegs positioned in specific configurations; (2) placing the springs around the pegs positioned on the mold board; (3) placing the mold board on a pouring table with the pegs and coils facing upward; (4) pouring liquid foam around the pegs onto the mold board; (5) waiting for the liquid foam to mature; and (6) removing the mold from the mature foam with embedded springs.

The mold board may be a metal board with the dimensions of the common mattress sizes, i.e., twin, full, queen, king. The pegs may also be made of metal or another similar material. The pegs are adjustably attachable to the mold board. The pegs may be positioned on the mold board in various configurations, depending on the specific needs and desires of the customer. Similarly, a different number of pegs may be utilized depending on the needs of the customer. For example, a customer who calls for a firmer mattress may elect to have many pegs positioned close together so as to minimize space between the corresponding springs thereby maximizing support.

Once the quantity and positioning of the pegs is determined, then the springs are placed around the pegs. Various types of springs may be utilized, such as Bonnell springs and Offset springs. Again, the type of spring utilized depends on the specific needs of the customer. Each peg corresponds to a spring. Next, the mold board is placed on a pouring table with the pegs and coils facing upward.

Liquid foam is then poured around the pegs onto the mold board. Different types of foam may be utilized, such as polyurethane, memory, or latex foam. Again, the type of foam utilized depends on the specific needs of the customer. Since the coils are wrapped around the pegs, when the liquid foam is poured, the liquid foam settles around the pegs and is embedded between the wires of the coils. The liquid foam must then mature and cool down into its hardened form. Once the liquid foam has matured, the mold is removed from the mature foam and the improved mattress is ready to be quilted and packaged for use.

DETAILED DESCRIPTION OF THE INVENTION

Figure 1:
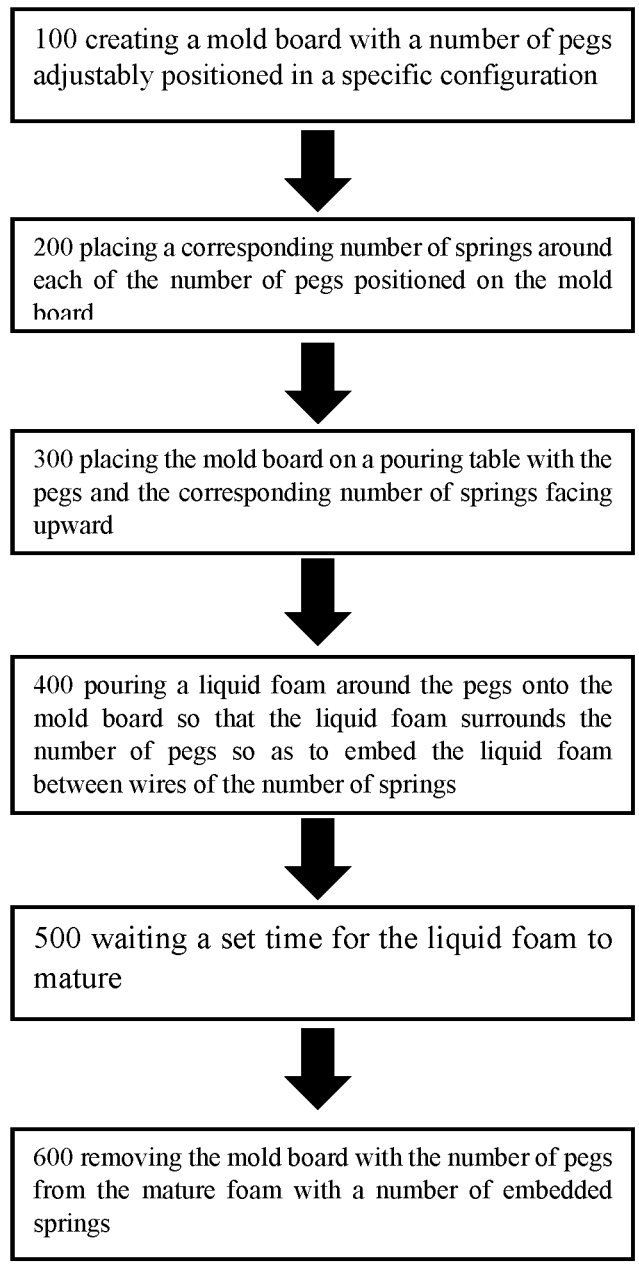
FIG. 1 depicts a flow-chart of the improved mattress manufacturing method embodying the principles of the present invention.

To promote an understanding of the principles of the present disclosure, reference will now be made to the embodiments illustrated in the drawings, which are described herein. The embodiments disclosed herein are not intended to be exhaustive or to limit the scope of the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

FIG. 1 depicts a flow-chart of the improved hybrid mattress manufacturing method embodying the principles of the present invention. The disclosed method of manufacturing an improved hybrid mattress comprises at least the following basic steps: step 100 creating the mold board with a number of pegs positioned in specific configurations; step 200 placing the springs around the pegs positioned on the mold board; step 300 placing the mold board on a pouring table with the pegs and coils facing upward; step 400 pouring liquid foam around the pegs onto the mold board; step 500 waiting for the liquid foam to mature; and step 600 removing the mold from the mature foam with embedded springs.

Figure 2:
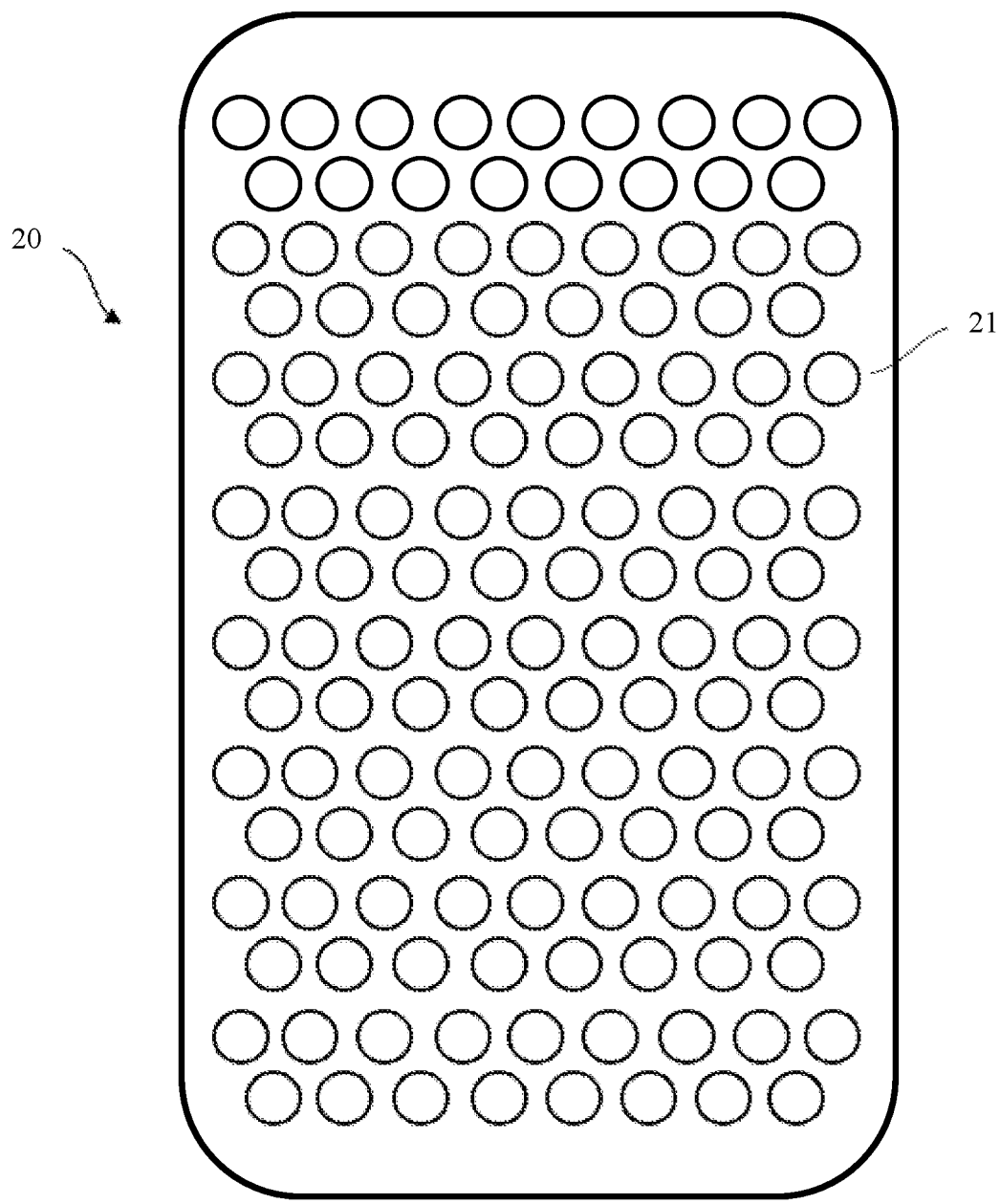
FIG. 2 depicts a top view of a twin sized mold board with a relatively large quantity of pegs positioned tightly together embodying the principles of the present invention.
Figure 3:
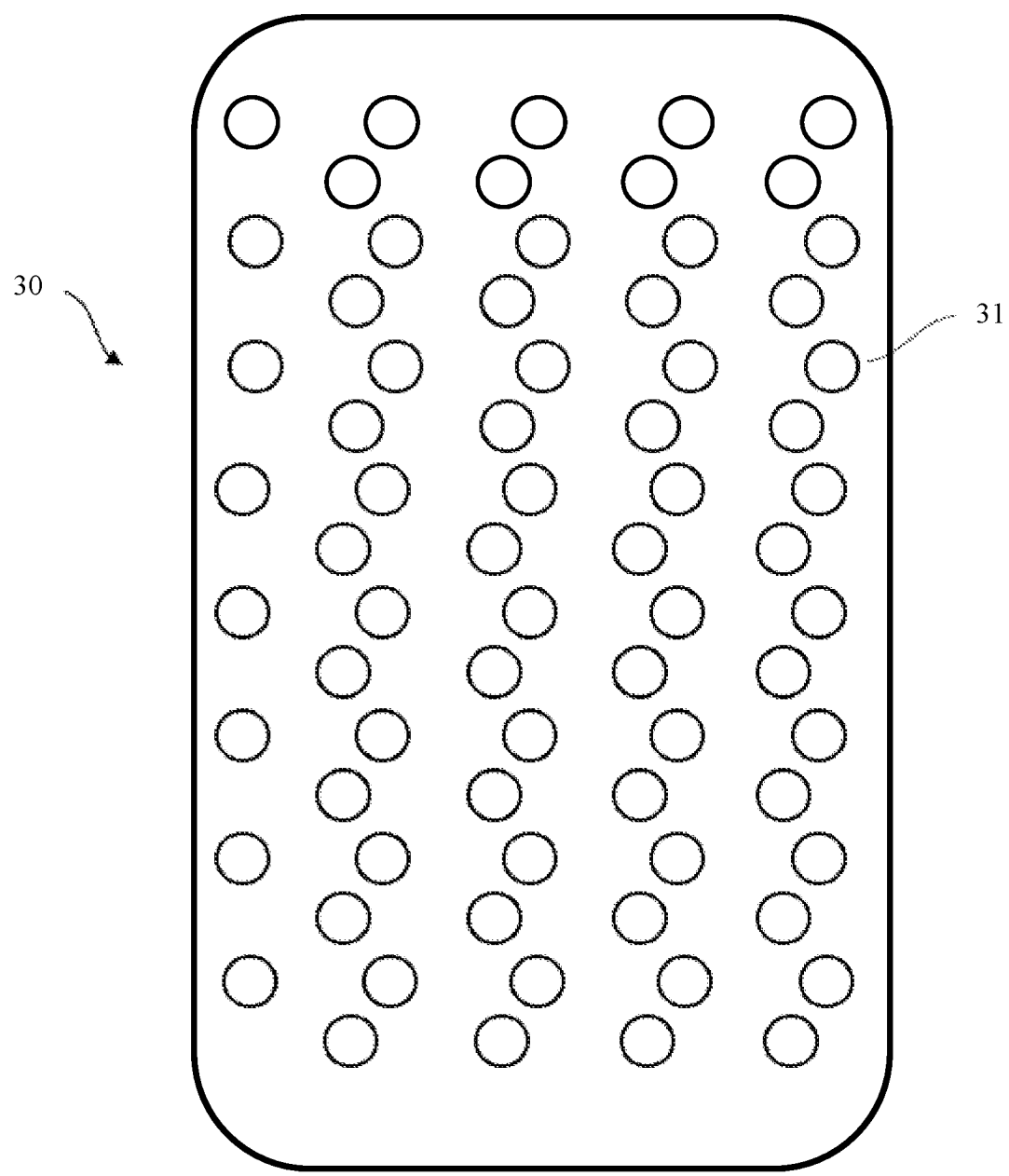
FIG. 3 depicts a top view of a twin sized mold board with an intermediate quantity of pegs positioned closer together embodying the principles of the present invention.
Figure 4:
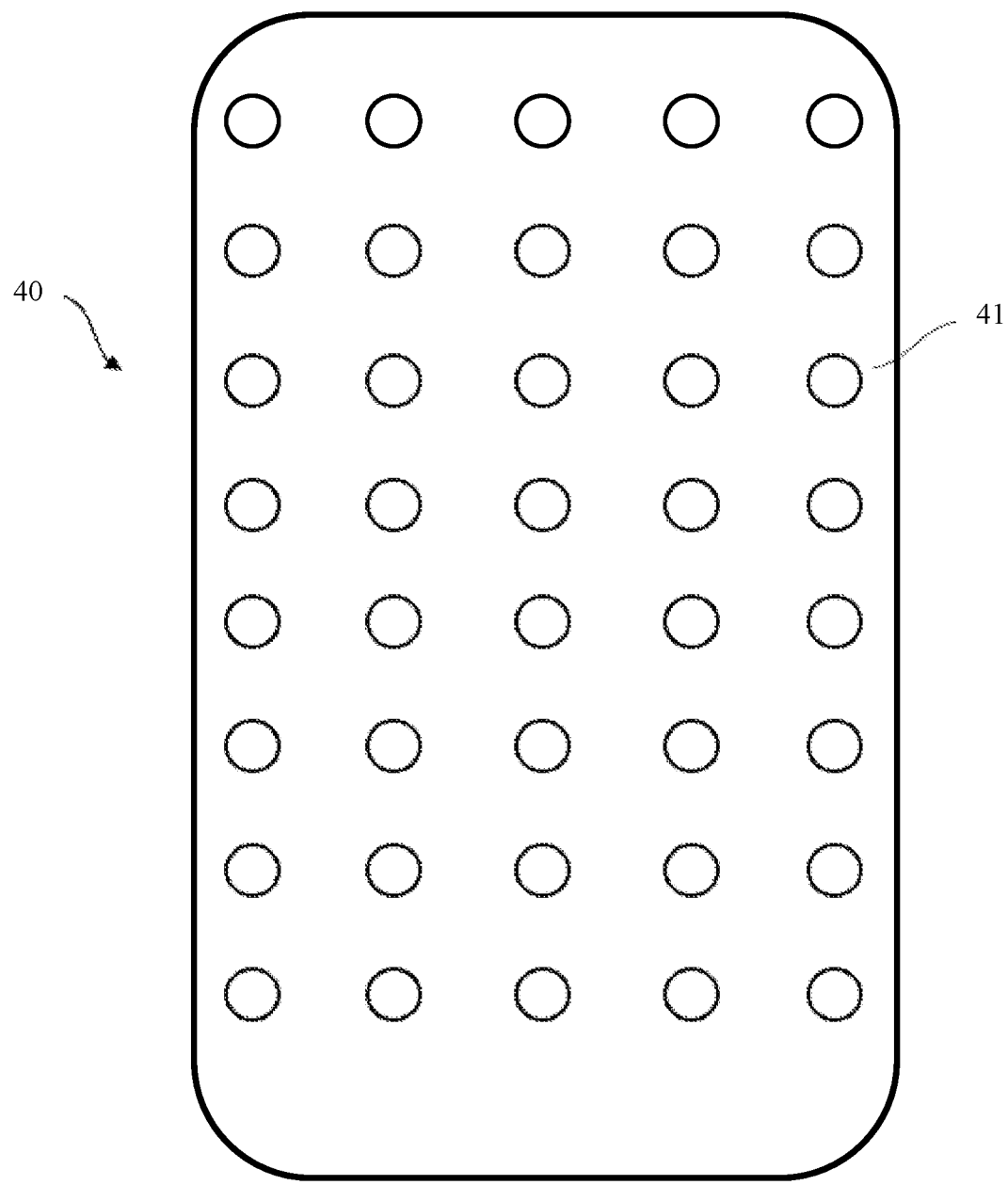
FIG. 4 depicts a top view of a twin sized mold board with a relatively small quantity of pegs positioned loosely together embodying the principles of the present invention.

FIGS. 2-4 depict exemplary mold boards with differing number of adjustably attachable pegs positioned in various configurations. For example, FIG. 2 depicts a twin sized mold board 20 with a relatively large quantity of pegs 21 positioned tightly together, thereby maximizing firmness and longevity. FIG. 3 depicts a twin sized mold board 30 with an intermediate quantity of pegs 31 positioned closer together, resulting in a medium-firm mattress with improved longevity. FIG. 4 depicts a twin sized mold board 4 with a relatively small quantity of pegs 41 positioned loosely, resulting in a softer mattress with improved longevity.

Figure 5:
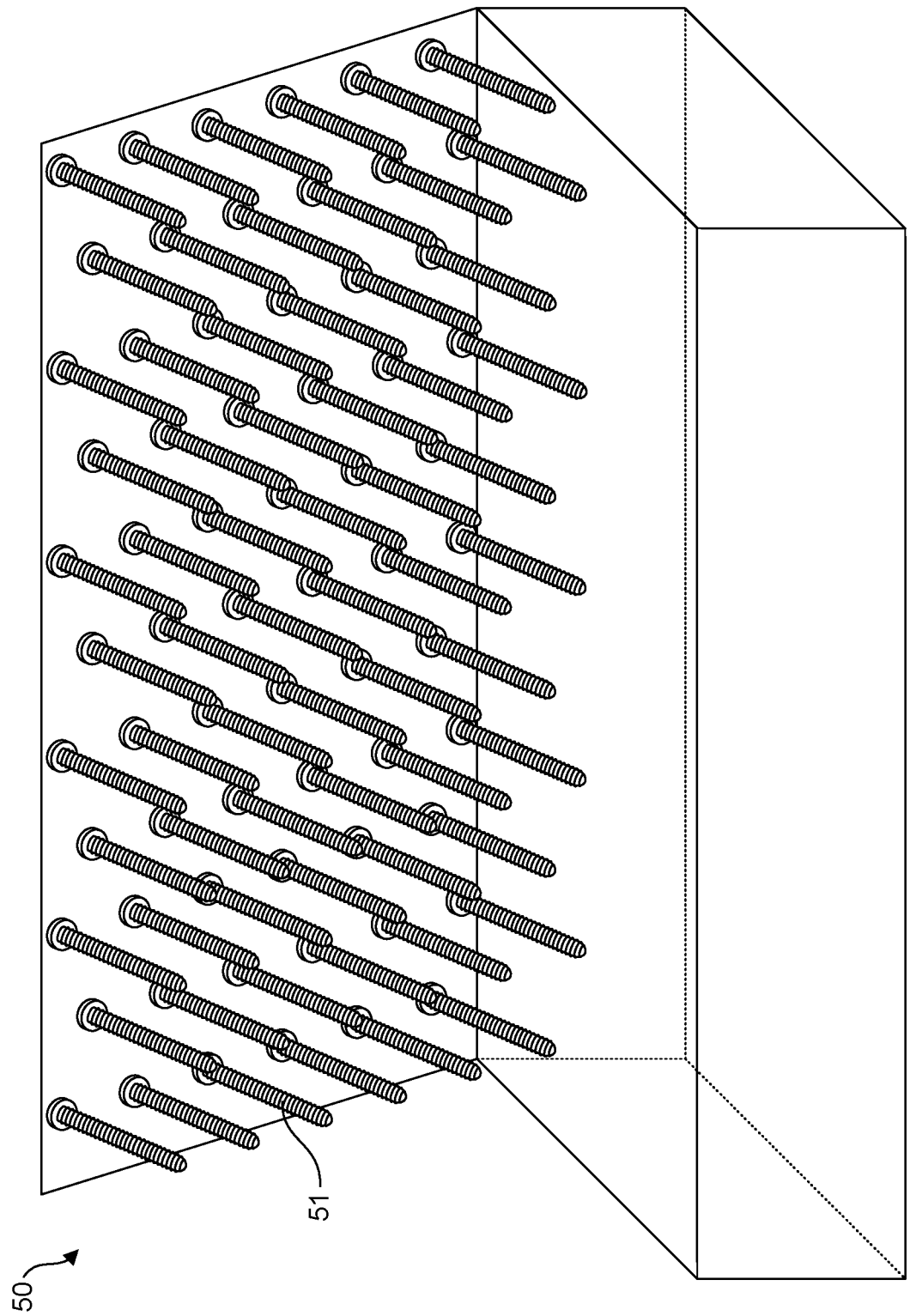
FIG. 5 depicts a perspective view of a mold board embodying the principles of the present invention.

FIG. 5 depicts a mold board 50 may be a metal board with the dimensions of the common mattress sizes, i.e., twin, full, queen, king, etc. The pegs 51 may also be made of metal or another similar material. The minimum number of pegs 51 needed per mold board 50 to achieve a desired firmness will vary depending on the size of the mattress. The pegs 51 are removably attachable to the mold board 50 by commonly known and simple methods such as a removable screw or the like. The pegs 51 may be adjustably positioned on the mold board 50 in various configurations, depending on the specific needs and desires of the customer. For example, a firmer mattress requires pegs and corresponding springs positioned tightly together (FIG. 2), while a softer mattress requires pegs and corresponding springs positioned in a looser configuration (FIG. 4). The pegs 51 may also be positioned in various geometric shapes so as to maximize support. Similarly, various numbers of pegs 51 may be utilized depending on the needs of the customer. For example, a customer who calls for a firmer mattress may elect to have a relatively large quantity of pegs and corresponding springs to maximize support (FIG. 2), or a smaller number of springs for a softer mattress (FIG. 4). In this regard, the positioning and number of pegs and corresponding springs can be fully customized into a myriad of iterations on a standard or customer-by-customer basis.

For simplicity and exemplary purposes, image a metal board 50 with three configurations: firm, medium-firm, and soft. The firm configuration utilizes the greatest number of pegs 51 and corresponding springs 60 generally positioned tight together, exemplified in FIG. 2. The medium-firm configuration utilizes an intermediate number of pegs 51 and corresponding springs 60 generally positioned loser, exemplified in FIG. 3. The soft configuration utilizes the smallest number of pegs 51 and corresponding springs 60 generally positioned loosely together, exemplified in FIG. 4. Similar mold board configurations can be applied to the common mattress sizes.

Figure 6:
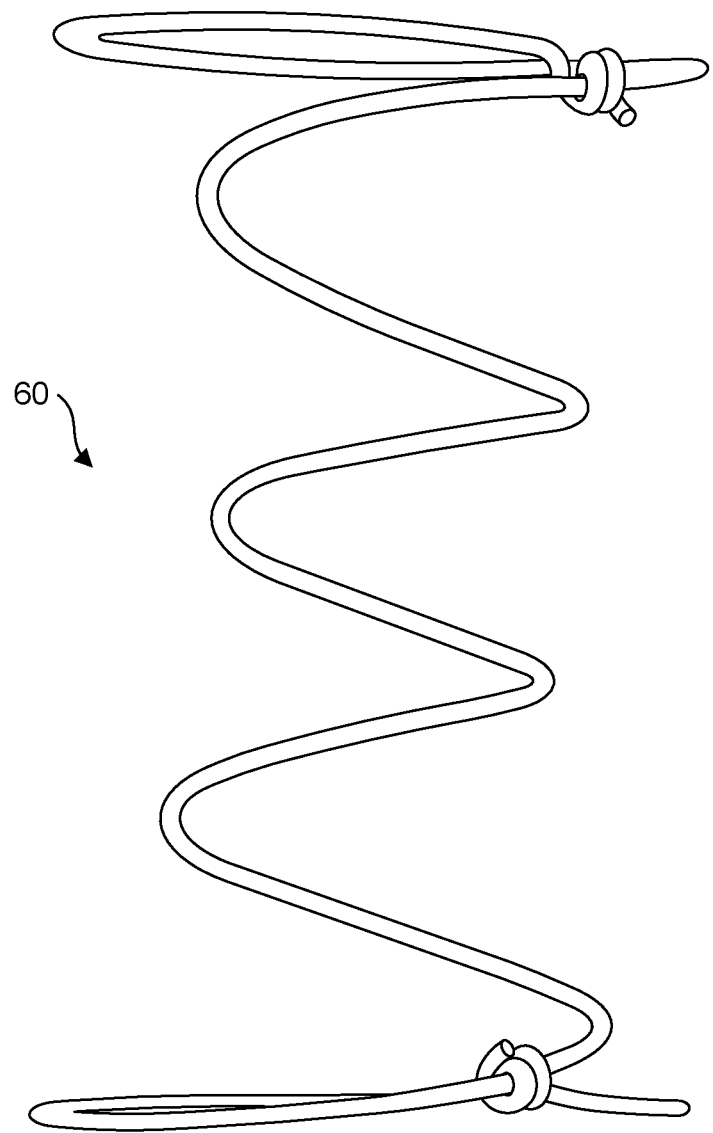
FIG. 6 depicts an exemplary spring embodying the principles of the present invention.
Figure 7:
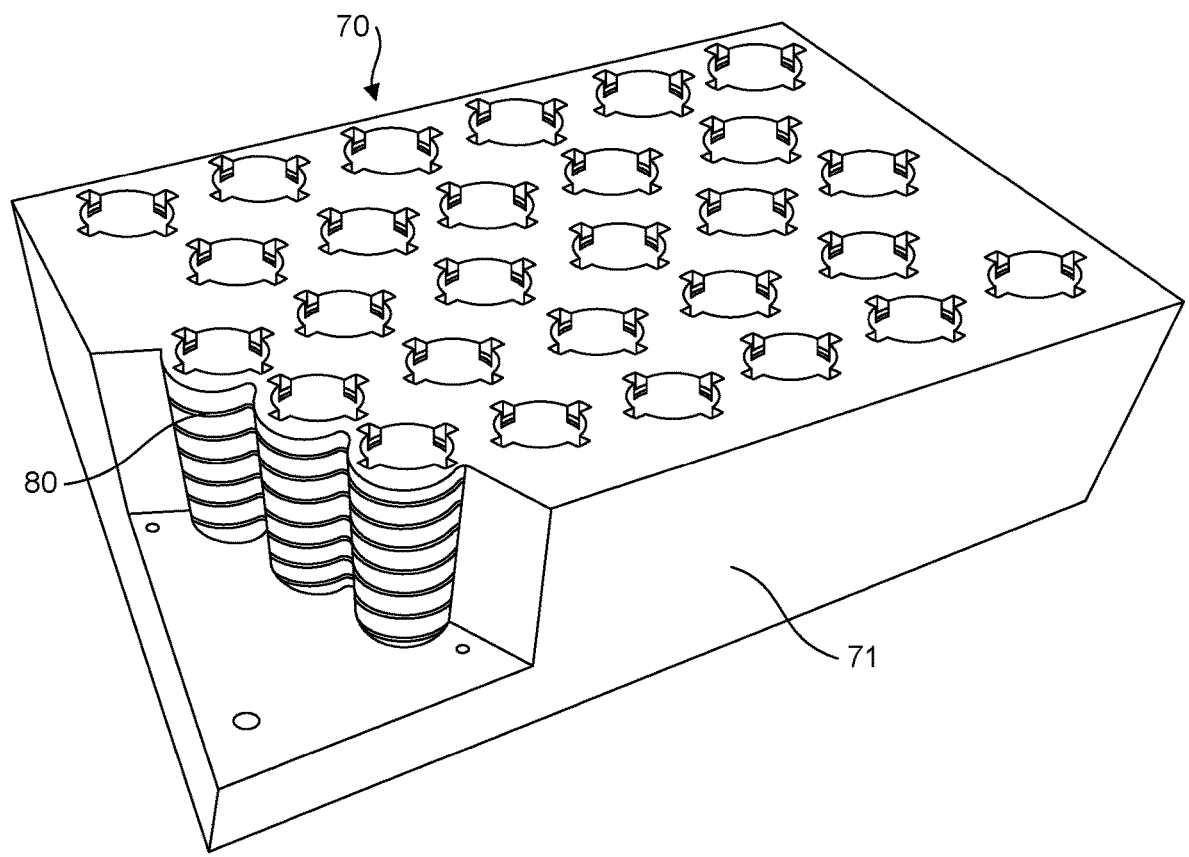
FIG. 7 depicts a perspective view of a cut-out of an improved mattress embodying the principles of the present invention.
Figure 8:
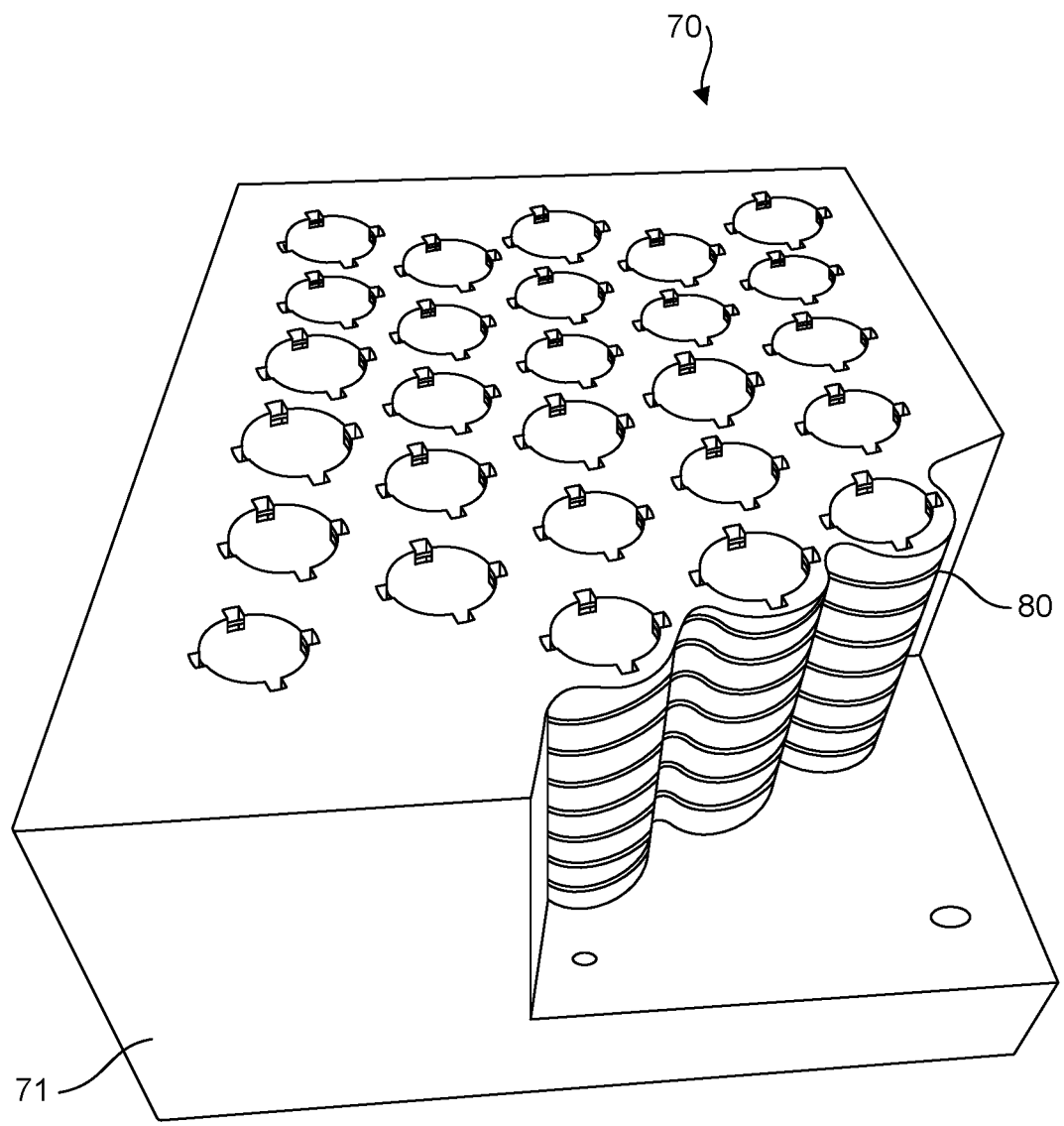
FIG. 8 depicts another perspective view of a cut-out of an improved mattress embodying the principles of the present invention.
Figure 9:
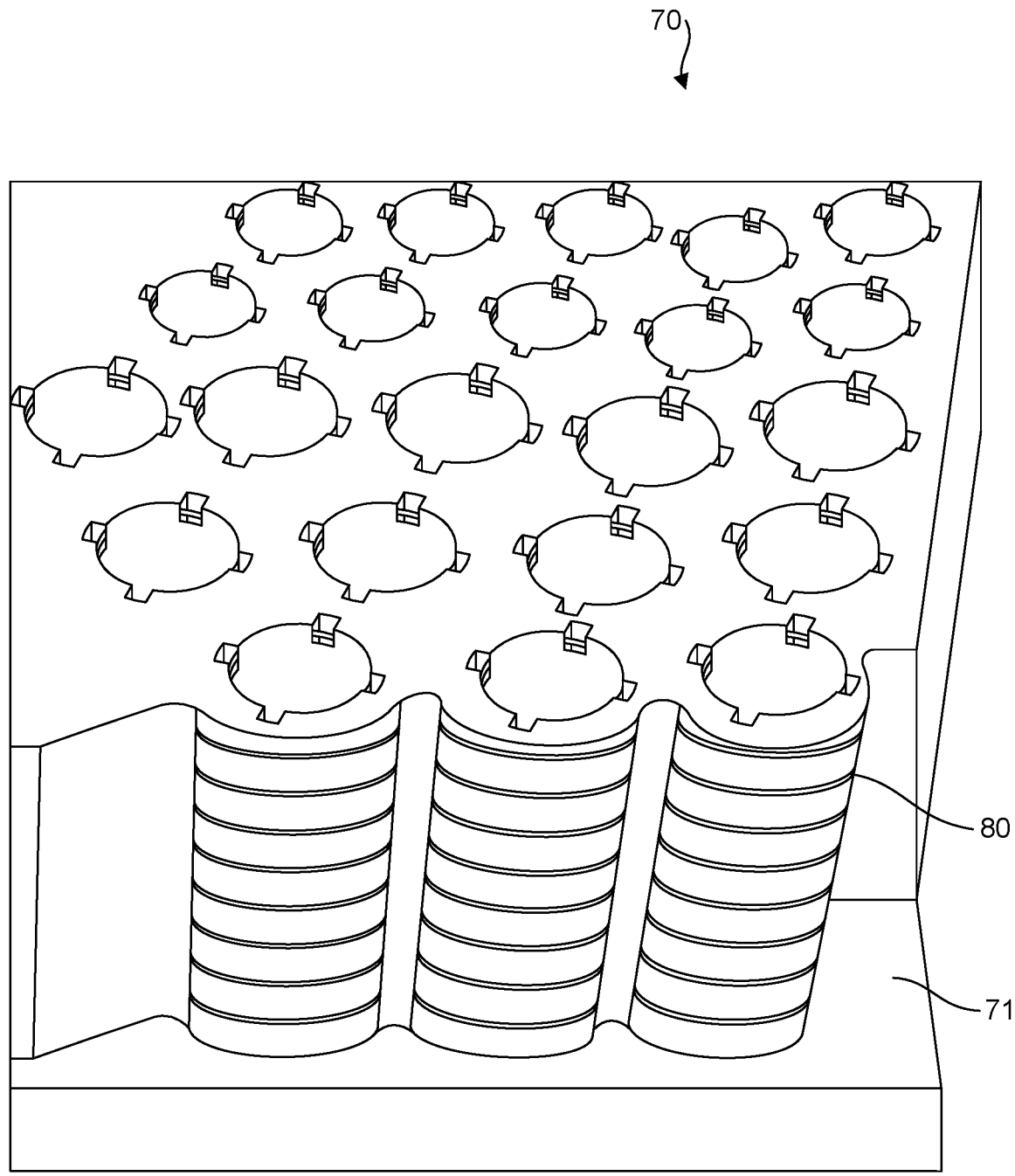
FIG. 9 depicts a close up view of foam embedded around springs in a cut-out of an improved mattress embodying the principles of the present invention.
Figure 10:
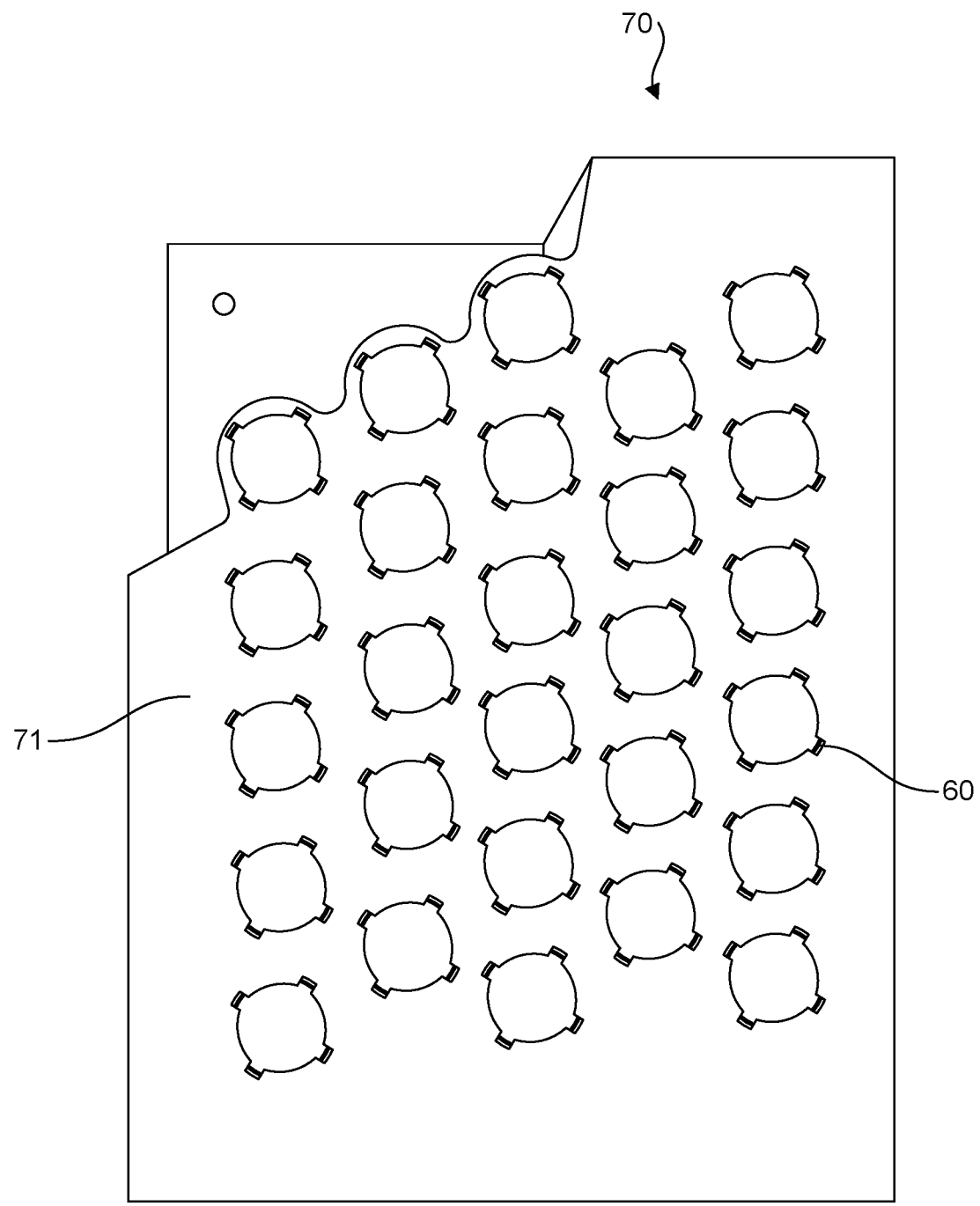
FIG. 10 depicts an aerial via of a cut-out of an improved mattress embodying the principles of the present invention.

Once the quantity and positioning of the pegs is determined, then the springs 50 are placed around the pegs 51. Each peg 51 corresponds to a spring 60. FIG. 6 depicts an exemplary spring 60 that can be positioned around a peg 51 of a sample mold board 50. Various types of springs 50 known in the industry may be utilized, such as bonnell springs and offset springs. Bonnell springs are the oldest and most common type of coil used in mattresses. They are hourglass-shaped, with a rounded top and bottom, and are connected together with wire. Bonnell springs are durable and provide good support, but they may not conform as well to the body as other types of springs. Offset springs are similar in shape to Bonnell springs but have a flat top and bottom that is angled to create a hinging effect. This allows the springs to conform more closely to the body, providing better support and reducing pressure points. Again, the type of spring 50 utilized depends on the specific needs of the customer. The specific type of spring 50 used in a mattress can affect its overall comfort, support, and durability. A combination of different types of springs 50 may be utilized to provide a more customized level of support and comfort.

Next, the mold board 50 is placed on a pouring table with the pegs 51 and springs 60 facing upward. Liquid foam 71 is then poured around the pegs 51 onto the mold board 50. Different types of foam 71 may be utilized, such as polyurethane, memory, or latex foam.

Polyurethane foam is a type of synthetic foam that is widely used in a variety of applications, including furniture cushions, insulation, and packaging materials. The foam can be molded into various shapes and densities, depending on the desired application. Polyurethane foam can be classified into two main types: flexible foam and rigid foam. Flexible foam is used in furniture cushions, mattresses, and car seats, among other applications. It is soft, lightweight, and conforms well to the body. Polyurethane foam is known for its durability, resistance to compression, and ability to retain its shape over time. It is also resistant to moisture and mildew.

Memory foam, also known as viscoelastic foam, is a type of polyurethane foam that is designed to contour to the body in response to heat and pressure. It was originally developed by NASA in the 1970s to improve the safety of aircraft cushions. Memory foam is made from a combination of polyurethane foam and additional chemicals that give it its unique properties. It is dense and supportive, but also soft and pliable, which allows it to conform closely to the body's shape. When weight is applied to the foam, it responds by sinking in and molding to the body's curves. When the pressure is released, the foam slowly returns to its original shape. One of the key benefits of memory foam is its ability to distribute weight evenly across the surface of the mattress or pillow. This can help to reduce pressure points and alleviate discomfort in areas like the hips, shoulders, and back. Memory foam is also known for its motion isolation properties, which can be beneficial for couples who are sensitive to their partner's movements during the night. Memory foam is available in a range of densities and firmness levels, allowing you to choose the right level of support and comfort for your needs. However, it can also be associated with a "sleeping hot" sensation, as it tends to retain body heat more than other types of foam. Some newer formulations of memory foam include cooling technologies designed to address this issue. Overall, memory foam is a popular choice for mattresses, pillows, and other sleep products due to its ability to provide customized support and comfort.

Latex foam is a type of foam made from the sap of the rubber tree. It is a natural and eco-friendly alternative to synthetic foam materials like polyurethane foam. Latex foam has several benefits over synthetic foams like polyurethane foam. It is naturally hypoallergenic, resistant to dust mites, and antimicrobial, making it a good choice for people with allergies or sensitivities. It is also durable and long-lasting, with a lifespan of up to 20 years or more. Latex foam is also known for its breathability, which helps to regulate body temperature and prevent overheating during sleep. It is available in a range of firmness levels, from soft to firm, making it a good choice for a variety of sleep preferences. Overall, latex foam is a high-quality and eco-friendly foam material that provides excellent support, comfort, and durability. Again, the type of foam 61 utilized depends on the specific needs of the customer. Further, a top layer of memory foam may be added for improved comfort.

Since the springs 60 are wrapped around the pegs 51, when the liquid foam 71 is poured, the liquid foam 71 settles around the pegs 51 and is embedded between the wires of the springs 60. The liquid foam 71 must then mature and cool down into its hardened form. FIGS. 6, 7, 8, and 9 depict exemplary cut-outs 70 of an improved mattress with foam 71 embedded within the springs 60. Once the liquid foam 71 has matured, the mold 50 is removed from the foam 71 and the customized mattress is ready to be quilted and packaged for use.

I claim:

1. A method of manufacturing a hybrid mattress, comprising the steps of:
   creating a mold board with a number of pegs adjustably positioned in a specific configuration;
   placing a corresponding number of springs around each of the number of pegs positioned on the mold board;
   placing the mold board on a pouring table with the pegs and the corresponding number of springs facing upward;
   pouring a liquid foam around the pegs onto the mold board so that the liquid foam surrounds the number of pegs so as to embed the liquid foam between wires of the number of springs;
   waiting a set time for the liquid foam to mature; and
   removing the mold board with the number of pegs from the mature foam with a number of embedded springs.

2. The method of claim 1, further comprising the step of determining the number of pegs and the corresponding number of springs to be utilized based on the specific needs of a customer.

3. The method of claim 1, further comprising the step of determining the specific configuration of the number of pegs and the corresponding number of springs based on the specific needs of a customer.

4. The method of claim 3, wherein the specific configuration of the number of pegs and the corresponding number of springs is either a tight configuration, intermediate configuration, or loose configuration.

5. The method of claim 1, further comprising the step of determining the type of corresponding number of springs to be utilized based on the specific needs of a customer.

6. The method of claim 5, wherein the type of corresponding number of springs utilized is either Bonnell springs or offset springs.

7. The method of claim 5, wherein the type of corresponding number of springs utilized is a combination of Bonnell springs and offset springs.

8. The method of claim 1, further comprising the step of determining the type of liquid foam to be utilized based on the specific needs of a customer.

9. The method of claim 8, wherein the type of liquid foam utilized is either polyurethane foam, memory foam, or latex foam.

10. The method of claim 1, further comprising the step of pouring a top layer of liquid memory foam and waiting for the top layer of liquid memory foam to mature.

11. The method of claim 1, wherein the mold board has either the dimensions of a twin mattress, a full mattress, a queen mattress, or a king mattress, depending on the specific needs of a customer.

12. The method of claim 1, wherein the number of pegs are metal.

13. The method of claim 1, wherein the number of pegs are removably attachable to the mold board.

* * * * *